United States Patent
Elias et al.

(10) Patent No.: US 9,639,452 B2
(45) Date of Patent: May 2, 2017

(54) AUTOMATED UPDATE TESTING AND DEPLOYMENT

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 193 days.

(21) Appl. No.: 13/836,482

(22) Filed: Mar. 15, 2013

(65) Prior Publication Data
US 2014/0281732 A1    Sep. 18, 2014

(51) Int. Cl.
G06F 9/44 (2006.01)
G06F 11/36 (2006.01)

(52) U.S. Cl.
CPC ...... *G06F 11/3668* (2013.01); *G06F 11/3692* (2013.01)

(58) Field of Classification Search
CPC ............ G06F 8/65; G06F 8/67; G06F 11/263
USPC ........................................................ 717/170
See application file for complete search history.

(56) References Cited

U.S. PATENT DOCUMENTS

| | | | |
|---|---|---|---|
| 7,155,462 B1* | 12/2006 | Singh et al. ................... | 717/170 |
| 8,001,422 B1* | 8/2011 | Sun et al. ........................ | 714/25 |
| 8,762,486 B1* | 6/2014 | Butaud et al. ................ | 709/217 |
| 8,990,778 B1* | 3/2015 | Allocca ............... | G06F 11/3692 717/126 |
| 9,268,663 B1* | 2/2016 | Siddiqui ............. | G06F 11/3447 |
| 2006/0101457 A1* | 5/2006 | Zweifel et al. ............... | 717/174 |
| 2008/0201462 A1* | 8/2008 | Liss ........................ | H04L 41/00 709/223 |
| 2008/0282112 A1* | 11/2008 | Bailey ................... | H04L 41/145 714/38.11 |
| 2009/0183145 A1* | 7/2009 | Hu et al. ....................... | 717/168 |

* cited by examiner

*Primary Examiner* — Duy Khuong Nguyen
(74) *Attorney, Agent, or Firm* — Lowenstein Sandler LLP

(57) ABSTRACT

Systems and methods for testing and deploying an update are provided. A first server can execute a current version of an application in a production environment. A client communication from a client to the first server can be identified. The client communication can be transmitted to a second server in the production environment. The second server can be executing an updated version of the application. A first response to the client communication from the first server and a second response to the client communication from the second server can be received. The first response from the first server can be compared with the second response from the second server to determine whether the updated version of the application is compatible with the production environment.

20 Claims, 4 Drawing Sheets

AUTOMATED UPDATE TESTING AND DEPLOYMENT

TECHNICAL FIELD

Implementations of the present disclosure relate to testing and deploying an update, and more specifically, to automated update testing and deployment in a production environment.

BACKGROUND

During the course of managing computer systems, systems administrators can receive updates for their computer systems from update providers. These updates can come in the form of patches, service packs, hotfixes, etc. Although update providers typically perform general tests on the updates prior to sending them to systems administrators, the update providers do not know every possible execution environment. Without being able to test the updates in all possible execution environments, the update providers might send updates that are incompatible to a customer's computer system. An incompatible update could cause problems when installed in a computer system by producing incorrect responses for requests, causing database inconsistencies, or might have other undesired consequences. Systems administrators can also attempt to test the updates after receipt but conventional update tests are limited in their ability to produce accurate results because they do not test the updates using actual production data.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods, apparatuses and systems for automatic testing and deploying updates for a computer system in a production environment are described herein. Conventionally, update provider tests computer system updates for major flaws prior to sending the updates to systems administrators or customers. The update providers, however, typically do not understand each operating environment where the update will be used. Further, it is impractical for the update providers to obtain production data for every possible scenario for testing the updates because it could involve obtaining real-time, production data from every customer they serve. Thus, the responsibility to thoroughly test an update falls on a systems administrator.

Implementations of the present disclosure help system administrators test updates they receive by enabling them to test the updates using live production data and automatically installing the update if the test passes. For example, an update can be installed on a server, and real production data can be used to simulate how the update would affect the operation of the server if the server was used in the production environment. The update can be tested before it is applied to the production environment, virtually eliminating the risk of destroying live data or the update crashing the production server. Updates that pass the tests can be automatically installed in the production environment.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
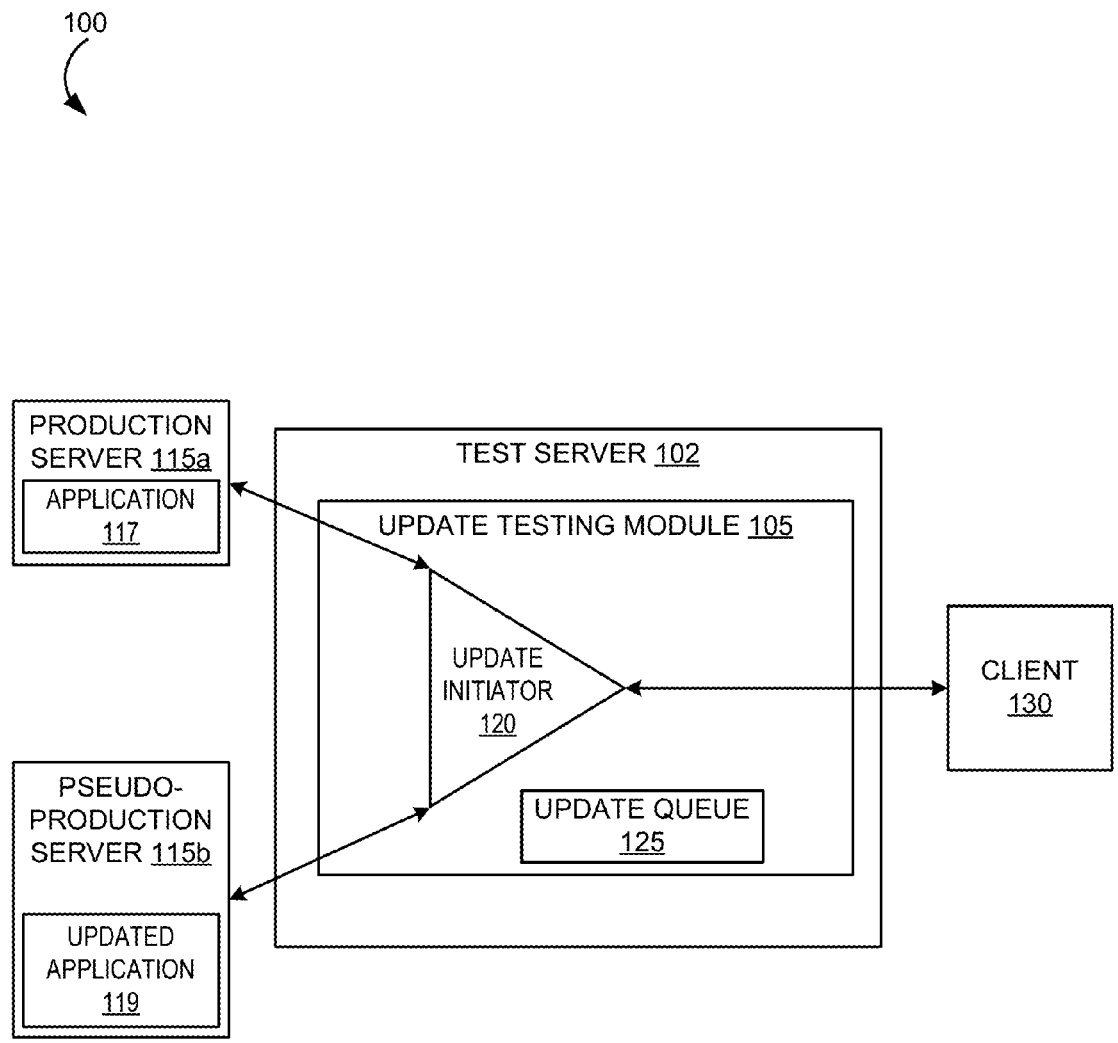
FIG. 1 is a block diagram that illustrates an example system architecture in which implementations of the present disclosure may be implemented.

FIG. 1 illustrates an example system architecture 100 in which implementations of the present disclosure can operate. System architecture 100 can include a test server 102 that is communicably connected to client 130, and production server 115a and pseudo-production server 115b. The test server 102 may communicate with client 130 over a network (not shown), such as a private network (e.g., a local area network (LAN), wide area network (WAN), intranet, etc.) or a public network (e.g., the Internet). Similarly, the test server 102 may communicate with production server 115a and pseudo-production server 115b over a network. The production server 115a and pseudo-production server 115b can alternatively be directly connected to the test server 102.

Test server 102 and production server 115a and pseudo-production server 115b can be servers of an organization and can be discrete physical machines. Production server 115a and pseudo-production server 115b each can be a server, a server cluster, a workstation, a personal computer (PC), a mobile device, tablet, laptop computer, or any other device, machine or cluster of machines capable of hosting a virtual machine. In one implementation, test server 102 and production server 115a and pseudo-production server 115b can be virtual machines running on one or more host machines (not shown). Test server 102 can be used to test an update to a computer system component (e.g., an update for a computer program or application, an update for a virtual device, an update for a physical device (e.g., a network card), etc.) in a simulated production environment, as described herein.

Client device 130 may be any electronic device, such as a desktop computer, a laptop computer, a server computer, a mobile phone (also referred to as cell or cellular phone), pager, personal digital assistant (PDA), wireless terminal, tablet, thin client, a server, another computer, gaming system, television, set-top box, DVD or Blu-Ray disc player, or another electronic device that can communicate with test server 102. There can be any number of client devices in system architecture 100.

The example system architecture 100 can illustrate a system for testing an updated application 119 in a simulated production environment. In the illustrated environment, at any time before or during updated application 119 testing, production server 115a is accessible to any entity, including client 130. Accesses and requests from the client 130 to production server 115a are live, as are responses from the production server 115a. For example, production server 115a can host application 117 managing a website that can be accessed by client 130.

To facilitate testing of the updated application 119, pseudo-production server 115b is used, where the pseudo-production server 115b is a clone of the production server 115a, except for having a different version of application 117. In particular, production server 115a includes a current version of application 117 and pseudo-production server 115b includes the application's updated version 119 that is being tested.

Test server 102 performs the testing of the updated application 119 and is placed between client 130 and production server 115a. Communications between client 130 and production server 115a can route through test server 102. Production server 115a can host a live application 117 (e.g., a website, a web application, a web-based service) accessible by client 130. During testing, client 130 can continue to access and receive responses from production server 115a and is unaware of the testing process.

Test server 102 is also connected to pseudo-production server 115b. To configure pseudo-production server 115b for the updated application 119 test, a state of production server 115a (e.g., the entire contents of production server 115a) can be copied to pseudo-production server 115b. The state of production server 115a can be copied to pseudo-production server 115b in real time. The pseudo-production server 115b can also receive a synchronization command to synchronize itself with production server 115a. In one implementation, production server 115a is suspended and its entire contents are copied to pseudo-production server 115b. Then production server 115a is resumed and pseudo-production server 115b is started. Once the pseudo-production server 115b is setup, it can be used to test an updated application 119 on production server 115a prior to the updated application 119 being installed on production server 115a.

Test server 102 can include an update testing module 105 for testing the updated application 119. Update testing module 105 can receive updated application 119 and cause it to be installed on the pseudo-production server 115b (e.g., by scheduling an automated install for a specific time).

Before installing the updated application 119 on production server 115a, testing module 105 can initiate a process to test the updated application 119 to detect any potential issues that installation of the updated application 119 might cause on production server 115a. Update testing module 105 can relay communications from client 130 for production server 115a to both production server 115a and pseudo-production server 115b. For example, update testing module 105 can relay communications intended for live application 117 to both the live application 117 of production server 115a and to the updated application 119 of pseudo-production server 115b. Update testing module 105 can receive responses to the client communications from production server 115a and pseudo-production server 115b and compare the responses. By comparing the responses, the update testing module 105 can identify differences in the responses. Using the identified differences, the update testing module 105 can determine whether the updated application 119 may affect operations in the production environment. Update testing module 105 can include an update queue 125 for storing data associated with the test. One embodiment of update testing module 105 is described in greater detail in conjunction with FIG. 2. Test server 102 and pseudo-production server 115b can be transparent to client 130, where client 130 may not be aware that test server 102 and pseudo-production server 115b exist.

Figure 2:
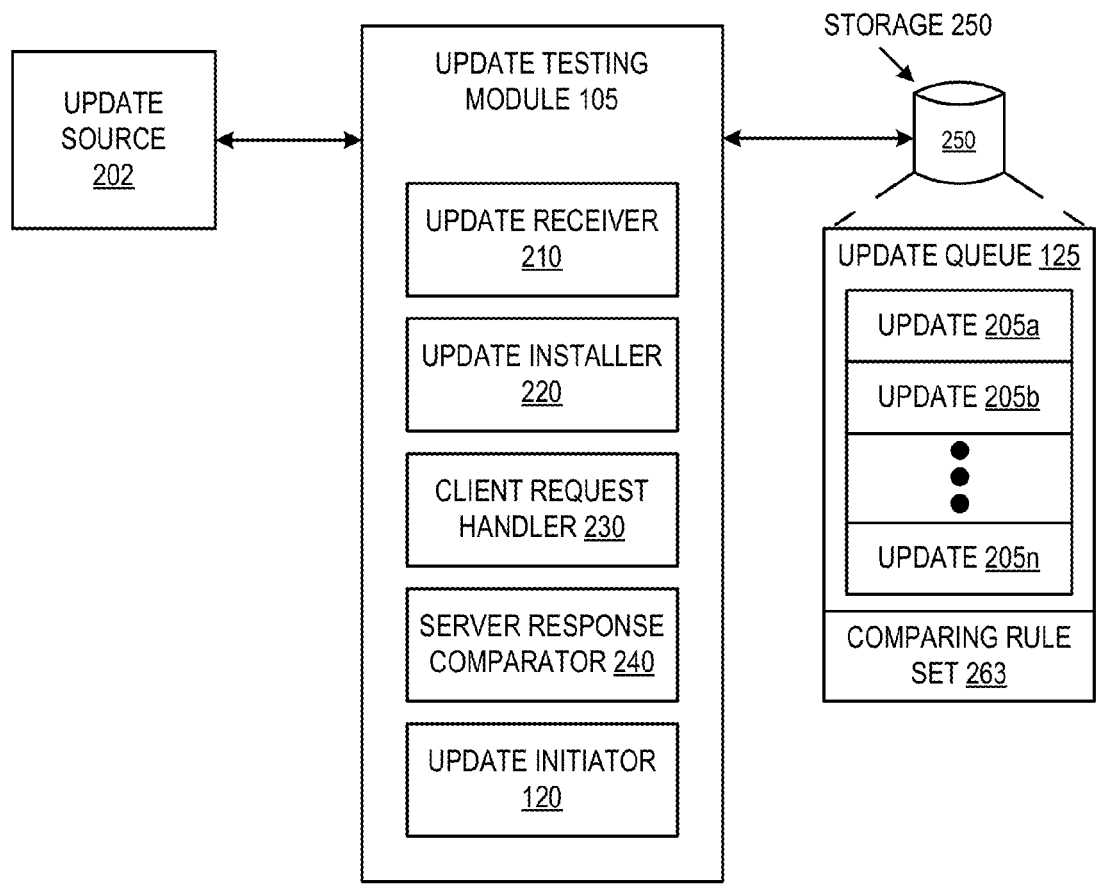
FIG. 2 is a block diagram illustrating one implementation of an update testing module.

FIG. 2 illustrates an update testing module 105 in accordance with one implementation. Update testing module 105 can be used to test and deploy an update for an application (e.g., an update for application 117) running on a production server (e.g., production server 115a). Update testing module 105 can include an update receiver 210, an update installer 220, a client request handler 230, a server response comparator 240 and an update initiator 120. Update testing module 105 can be communicably connected to storage 250.

Update testing module 105 may include more or fewer components. Alternatively, the functionality of one or more of the update receiver 210, update installer 220, client request handler 230, server response comparator 240, or update initiator 120 may be combined into a single module, or may be divided into additional modules.

Update receiver 210 receives an update 205 for an application running on the production server from an update source 202. The update 205 can be the updated application 119 of FIG. 1. When the update 205 is received, it can be stored in an update queue 125 in storage 250, which may be a file system, database or other data management layer resident on a data storage device such as a disk drive, RAM, ROM, database, etc. When an update 205 is stored in update queue 125, a sequence to test the update in a simulated production environment can begin. When multiple updates 205a-205n are received and stored in update queue 125, then each update 205 can be tested in any order. In one implementation, multiple updates 205 are tested in the order they were received. In another implementation, updates 205 are tested as "last in, first out." In a further implementation, updates 205 are prioritized and tested in order of decreasing priority.

To test the update 205, update installer 220 can check if the system is properly configured, as described in FIG. 1. Update installer 220 can check whether production server 115a and pseudo-production server 115b are connected to test server 102 and whether test server 102 is connected between production server 115a and pseudo-production server 115b and client 130. If the system is not properly configured, update installer 220 can cause the system to be configured (e.g., instantiate pseudo-production server 115b, copy the state of production server 115a to pseudo-production server 115b, connect an update initiator 120 to production server 115a and to pseudo-production server 115b and connect test server 102 to client 130). When the system is properly configured, update installer 220 can cause the update 205 to be installed on pseudo-production server 115b.

Once the system is properly configured and the update 205 is installed on pseudo-production server 115b, the client request handler 230 can identify a communication from the client to production server 115a. Client request handler 230 can cause both production server 115a and pseudo-production server 115b to receive client communications. If during system configuration client request handler 230 receives a client communication and production server 115a or pseudo-production server 115b are not ready to receive the client communication, client request handler 230 can hold the communication and transmit it to production server 115a and pseudo-production server 115b when they are ready. In this manner, both production server 115a and pseudo-production server 115b can receive the same communication from client 130. In one implementation, client request handler 230 intercepts the client communication from the client to production server 115a, replicates the client communication, and transmits it to pseudo-production server 115b. Production server 115a and pseudo-production server 115b can process the client communication and send a response to update testing module 105.

Client request handler 230 receives the responses from production server 115a and pseudo-production server 115b and transmits the response from production server 115a to client 130, since production server 115a is in a production environment and also to maintain transparency of the update testing routine to the client 130. Client request handler 230 can hold the response from pseudo-production server 115b without transmitting it to client 130. Client request handler 230 can continue to identify communications from client 130 to production server 115a, receive responses from production server 115a and pseudo-production server 115b, and transmit the responses from production server 115a to client 130 for a period of time.

Server response comparator 240 can identify and compare one or more responses from production server 115a and pseudo-production server 115b during any time period. Server response comparator 240 can identify any differences between the response from production server 115a and the response from pseudo-production server 115b. Using the responses and any identified differences between them, server response comparator 240 can determine whether the update 205 (e.g., updated application 119) installed on pseudo-production server 115b is compatible with the production environment. When server response comparator 240 does not identify any differences between the response from production server 115a and pseudo-production server 115b, then the server response comparator 240 can determine that the update 205 installed on pseudo-production server 115b is compatible with the production environment. Likewise, when the server response comparator 240 does not identify differences between multiple responses from production server 115a and pseudo-production server 115b for a period of time, server response comparator 240 can determine that the update 205 installed on pseudo-production server 115b is compatible with the production environment.

When server response comparator 240 identifies at least one difference between the response from production server 115a and pseudo-production server 115b, then server response comparator 240 can consult with a comparing rule set 263 to see if the at least one difference is allowable. The comparing rule set 263 can describe acceptable or allowable differences between the two responses. Comparing rule set 263 can be one or more scripts that evaluate the differences between the responses from the production server 115a and pseudo-production server 115b and can return a "True" value if the differences are allowable. In one implementation, the update is rejected if at least one of the scripts does not return a "True" value. Comparing rule set 263 can be packaged with the update. Comparing rule set 263 can also be supplement or replace rules that were packaged with the update. A system administrator, for example, can specify allowable differences and can include these in the comparing rule set 263. If at least one difference between one or more responses from production server 115a and pseudo-production server 115b is not allowed or impermissible under the comparing rule set 263, then the update can be deemed incompatible in the production environment. An incompatible update can be rejected and update testing module 105 can recommend not installing the update on servers within the production environment.

In one implementation, comparing the responses from the production server 115a and pseudo-production server 115b can include identifying one or more differences between the responses. It can also include prompting a system administrator of the identified differences and waiting to receive compatibility input from the system administrator. The compatibility input can include manual input from the system administrator on whether the identified differences are allowable. In one implementation, the server response comparator 240 can identify a problematic part or portion of code of the update 205.

For updates with no identified differences or for updates with allowable differences, update initiator 120 can install the update to the production environment by redirecting communications from client 130 to pseudo-production server 115b, which has the installed update (e.g., as updated application 119). For example, when the update 205 is compatible with the production environment, the update initiator 120 can deactivate production server 115a and can activate pseudo-production server 115b as a production server, which can result in a relatively quick update to the client-facing application. In one implementation, update initiator 120 can inform update installer 220 that production server 115a is deactivated and update installer 220 can install the update on production server 115a.

Update testing module 105 can be communicably connected to storage 250, which can store one or more updates 205 in an update queue 125 and comparing rule set 263. Storage 250 can be a persistent storage that is capable of storing data. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. Storage 250 can be internal to the update testing module 105 or external to update testing module 105 and accessible by the update testing module 105 via a network. As will be appreciated by those skilled in the art, in some implementations storage 250 may be a network-attached file server or a cloud-based file server, while in other implementations storage 250 might be some other type of persistent storage such as an object-oriented database, a relational database, and so forth.

In one implementation, when the update receiver 210 receives the update 205 (e.g., updated application 119 or a patch for application 117) and stores it in update queue 125, the update testing module 105 can initiate an update test routine. In one implementation, the update receiver 210 can be in a listen mode that waits for an update 205 to be sent to the update queue 125. The update 205 can be sent by an update creator that pushes updates to customers and update 205 can be automatically inserted into the update queue 125. In another implementation, the update receiver 210 can actively scan a remote directory or storage for updates. When it detects an available update, it can pull the update to the update queue 125. In another implementation, a system administrator can upload an update to the update queue 125.

Figure 3:
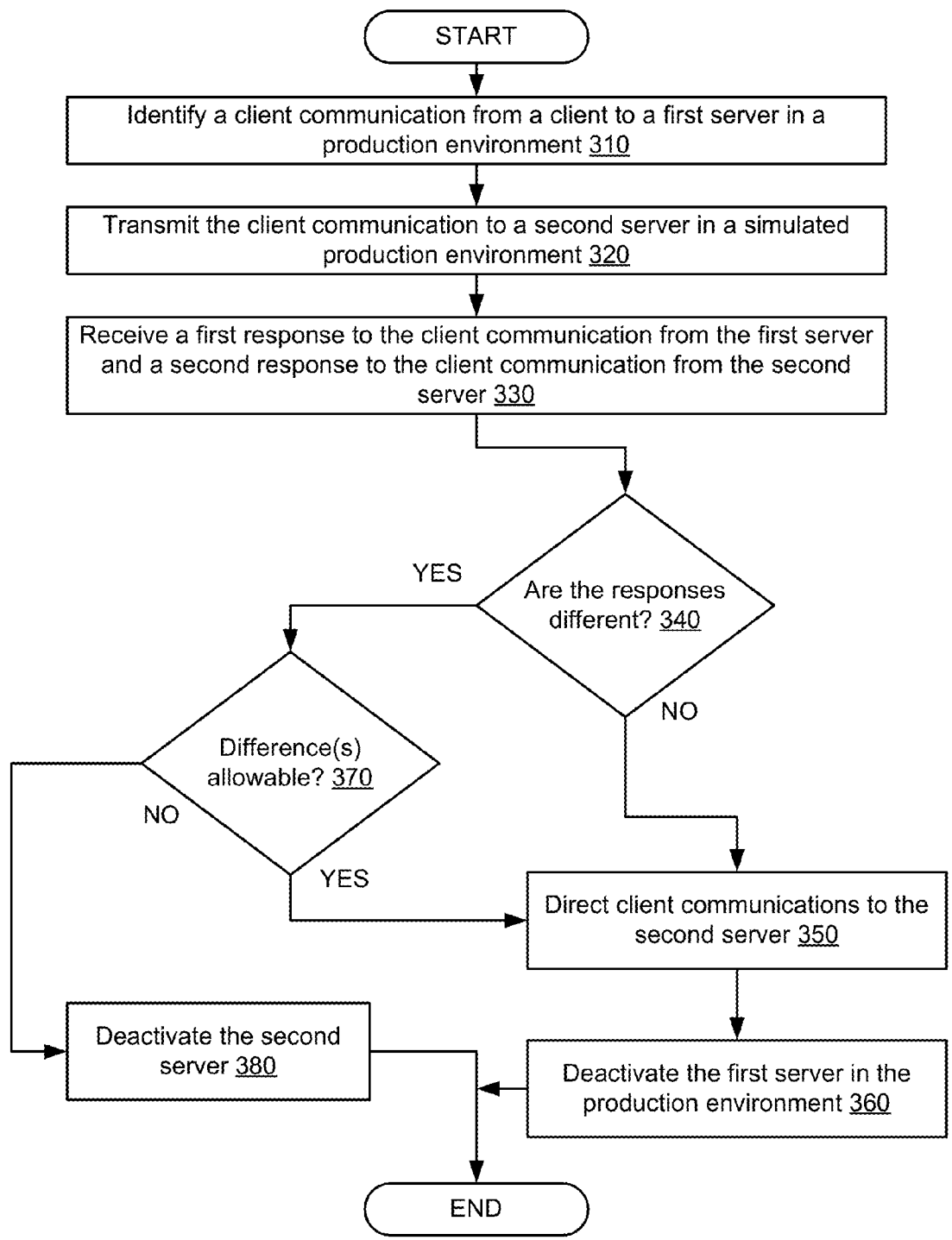
FIG. 3 is a flow diagram illustrating an implementation of a method for testing and deploying an update.

FIG. 3 is a flow diagram illustrating of one implementation of a method 300 for testing and deploying an update. Method 300 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 300 is performed primarily by update testing module 105 of FIGS. 1-2.

Referring to FIG. 3, in one implementation, method 300 begins at block 310, with processing logic identifying a client communication from a client (e.g., client 130) to a first server (e.g., production server 115a) in a production environment. The first server can be executing a current version of an application (e.g., application 117).

At block 320, processing logic can transmit the client communication to a second server (e.g., pseudo-production server 115b) executing an updated application (e.g. updated application 119) in the simulated production environment. At block 330, processing logic can receive a first response to the client communication from the first server and a second response to the client communication from the second server.

At block 340, processing logic can compare the first response from the first server with the second response from the second server to determine whether the updated application is compatible with the production environment. If there are no differences, processing logic can direct client communications to the second server at block 350 and can deactivate the first server in the production environment at block 360, thereby applying or installing the update to the production environment.

If there are one or more differences between the responses from the servers, then at block 370 processing logic can determine if the one or more differences are allowable. Processing logic can use a comparing rule set and/or compatibility input from a system administrator to determine if the one or more differences are allowable. If the differences are allowable, processing logic can proceed to block 350 and can direct client communications to the second server and can deactivate the first server at block 360, thereby installing the update to the production environment. The differences can be allowable when the first response from the first server corresponds to the second response from the second server. If the differences are not allowable, then processing logic can proceed to block 380, deactivate the second server in the simulated production environment and continue using the first server, thereby rejecting the update.

Figure 4:
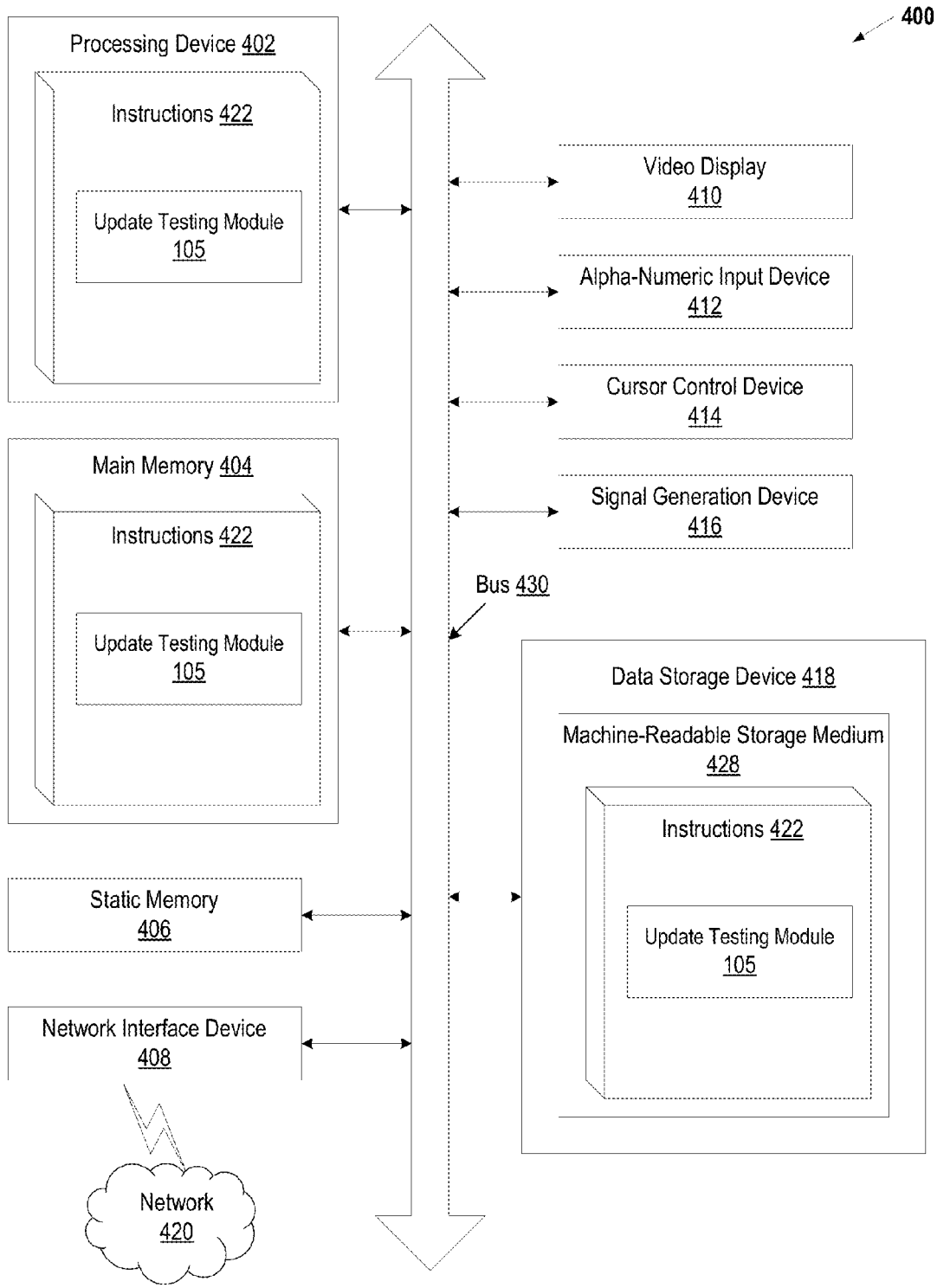
FIG. 4 illustrates an example test server machine.

Processing logic can handle any number of client communications from the client over a time period. Processing logic can compare any number of first responses from the first server with any number of second responses from the second server during the time period. If there are no differences between the responses from the servers during the time period, or if all differences during the time period are allowable, processing logic can direct client communications to the second server and can deactivate the first server in the production environment, thereby installing the update to the production environment FIG. 4 illustrates a diagrammatic representation of a machine in the example form of a computing system 400 (e.g., test server machine 102) within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 can be configured to execute the update testing module 105 for performing the operations and steps discussed herein.

Computing system 400 may further include a network interface device 408. Computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 428 having one or more sets of instructions (e.g., update testing module 105) embodying any one or more of the methodologies of functions described herein. The update testing module 105 may also reside, completely or at least partially, within main memory 404 and/or within processing device 402 during execution thereof by computing system 400; main memory 404 and processing device 402 also constituting machine-readable storage media. The update testing module 105 may further be transmitted or received over a network 420 via network interface device 408.

Machine-readable storage medium 420 may also be used to store the device queue manager logic persistently. While machine-readable storage medium 420 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "deactivating," "comparing," "intercepting," "replicating," "prompting," "passing", "processing", "causing", "instructing", "disabling", or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
receiving a client communication from a client in a production environment;
transmitting, by the processing device, the client communication to a first server and to a second server, the first server being in the production environment and comprising a current version of an application and the second server comprising an updated version of the application;
receiving, by the processing device, a first response to the client communication from the first server and a second response to the client communication from the second server;
comparing, by the processing device, the first response from the first server with the second response from the second server to identify a difference;
determining whether the updated version of the application is compatible with the production environment in view of the identified difference, wherein the updated version is determined to be compatible with the production environment when the identified difference is allowable under a comparing rule set; and
transmitting, by the processing device, to the client either the first response or the second response in view of the determination of whether the updated version of the application is compatible with the production environment, wherein the second response is transmitted to the client in response to determining that the updated version of the application is compatible.

2. The method of claim 1, further comprising:
intercepting the client communication from the client; and
replicating the client communication from the client.

3. The method of claim 1, further comprising:
determining that the updated version of the application is incompatible with the production environment when the identified difference between the first response from the first server and the second response from the second server is impermissible under the comparing rule set.

4. The method of claim 1, further comprising:
prompting a system administrator of the difference between the first response from the first server and the second response from the second server;
obtaining compatibility input from the system administrator; and
deactivating the first server in the production environment when the compatibility input from the system administrator indicates that the difference between the first response from the first server and the second response from the second server is allowable.

5. The method of claim 1 further comprising, updating the current version of the application to the updated version of the application, wherein the updating comprises:
deactivating the first server in response to determining that the updated version of the application is compatible with the production environment; and
activating the second server.

6. The method of claim 1 further comprising:
receiving a plurality of responses from the first server and a plurality of responses from the second server;
comparing the plurality of responses from the first server with the plurality of responses from the second server to determine whether the updated version of the application is compatible with the production environment; and deactivating the first server in the production environment when the updated version of the application is compatible with the production environment.

7. The method of claim 1 further comprising:
receiving a plurality of updates to the application;
placing the plurality of updates to the application in an update queue; and
installing each of the plurality of updates to the second server.

8. A system, comprising:
a memory; and
a processing device, operatively coupled with the memory, to:
  receive a client communication from a client in a production environment;
  transmit the client communication to a first server and to a second server, the first server being in the production environment and comprising a current version of an application and the second server comprising an updated version of the application;
  receive a first response to the client communication from the first server and a second response to the client communication from the second server;
  compare the first response from the first server with the second response from the second server to identify a difference;
  determining whether the updated version of the application is compatible with the production environment in view of the identified difference, wherein the updated version is determined to be compatible with the production environment when the identified difference is allowable under a comparing rule set; and
  transmit to the client either the first response or the second response in view of the determination of whether the updated version of the application is compatible with the production environment, wherein the second response is transmitted to the client in response to determining that the updated version of the application is compatible.

9. The system of claim 8, the processing device further to:
intercept the client communication from the client; and
replicate the client communication from the client.

10. The system of claim 8, wherein the processing device further to:
determine that the updated version of the application is incompatible with the production environment when the identified difference between the first response from the first server and the second response from the second server is impermissible under the comparing rule set.

11. The system of claim 8, wherein the processing device is further to:
prompt a system administrator of the difference between the first response from the first server and the second response from the second server;
obtain compatibility input from the system administrator; and
deactivate the first server in the production environment when the compatibility input from the system administrator indicates that the difference between the first response from the first server and the second response from the second server is allowable.

12. The system of claim 8, wherein the processing device is further to:
update the current version of the application to the updated version of the application;
deactivate the first server in response to determining that the updated version of the application is compatible with the production environment; and
activate the second server.

13. The system of claim 12, wherein the current version of the application is updated using a patch, wherein the patch comprises script for installing the patch.

14. The system of claim 8, wherein the processing device further to:
receive a plurality of updates to the application;
place the plurality of updates to the application in an update queue; and
install each of the plurality of updates to the second server.

15. A non-transitory computer readable storage medium comprising instructions that, when executed by a processing device, cause the processing device to:
receive a client communication from a client in a production environment;
transmit the client communication to a first server and to a second server, the first server being in the production environment and comprising a current version of an application and the second server comprising an updated version of the application;
receive a first response to the client communication from the first server and a second response to the client communication from the second server;
compare, by the processing device, the first response from the first server with the second response from the second server to identify a difference;
determine, by the processing device, whether the updated version of the application is compatible with the production environment in view of the difference, wherein the updated version of the application is compatible with the production environment when the identified difference is allowable under a comparing rule set; and
transmit to the client either the first response or the second response in view of the determination of whether the updated version of the application is compatible with the production environment, wherein the second response is transmitted to the client in response to determining that the updated version of the application is compatible.

16. The non-transitory computer readable storage medium of claim 15, wherein the processing device is further to:
intercept the client communication from the client; and
replicate the client communication from the client.

17. The non-transitory computer readable storage medium of claim 15, wherein the processing device is to:
determine that the updated version of the application is incompatible with the production environment when the identified difference between the first response from the first server and the second response from the second server is impermissible under the comparing rule set.

18. The non-transitory computer readable storage medium of claim 15, wherein the processing device is further to:
prompt a system administrator of the difference between the first response from the first server and the second response from the second server;
obtain compatibility input from the system administrator; and
deactivate the first server in the production environment when the compatibility input from the system administrator indicates that the difference between the first response from the first server and the second response from the second server is allowable.

19. The non-transitory computer readable storage medium of claim 15, wherein the processing device is further to:
receive a plurality of responses from the first server and a plurality of responses from the second server;
compare the plurality of responses from the first server with the plurality of responses from the second server to determine whether the updated version of the application is compatible with the production environment; and
deactivate the first server in the production environment when the updated version of the application is compatible with the production environment.

20. The non-transitory computer readable storage medium of claim 19, wherein the current version of the application is updated using a patch, wherein the patch comprises script for installing the patch.

* * * * *